United States Patent [19]

Takekoshi et al.

[11] 3,989,670

[45] *Nov. 2, 1976

[54] METHOD FOR MAKING POLYETHERIMIDES

[75] Inventors: Tohru Takekoshi, Scotia, N.Y.;
John E. Kochanowski, Pittsfield, Mass.

[73] Assignee: General Electric Company, Schenectady, N.Y.

[ * ] Notice: The portion of the term of this patent subsequent to Apr. 9, 1991, has been disclaimed.

[22] Filed: Feb. 6, 1974

[21] Appl. No.: 439,866

Related U.S. Application Data

[63] Continuation-in-part of Ser. No. 319,372, Dec. 29, 1972.

[52] U.S. Cl. .................... 260/47 CP; 260/46.5 E; 260/49; 260/78 TF
[51] Int. Cl.² ........................................ C08G 69/32
[58] Field of Search ............. 260/47 CP, 49, 78 TF, 260/47 CZ

[56] References Cited
UNITED STATES PATENTS

| | | | |
|---|---|---|---|
| 3,179,634 | 4/1965 | Edwards | 260/47 CZ |
| 3,624,050 | 1/1970 | Strickrodt | 260/47 CP |
| 3,649,601 | 3/1972 | Critchley et al. | 260/78 TF |
| 3,699,075 | 10/1972 | Lubowitz | 260/49 |
| 3,803,085 | 4/1974 | Takekoshi et al. | 260/46.5 E |
| 3,838,101 | 9/1974 | Steele et al. | 260/47 EN |

*Primary Examiner*—Lewis T. Jacobs
*Attorney, Agent, or Firm*—William A. Teoli; Joseph T. Cohen; Jerome C. Squillaro

[57] ABSTRACT

A process for making polyetherimides is provided by melt polymerizing a mixture of certain aromatic bis(etheranhydride)s and organic diamines. The polyetherimides can be reinforced with various fillers to produce high performance composites.

4 Claims, No Drawings

METHOD FOR MAKING POLYETHERIMIDES

This is a continuation-in-part of our copending application, Ser. No. 319,372, filed Dec. 29, 1972, and assigned to the same assignee as the present invention.

The present invention relates to a melt polymerization process for making polyetherimides based on the reaction between certain aromatic bis(etheranhydride)s and organic diamines.

Prior to the present invention polyimides were generally made from a polyamide acid intermediate. A dipolar aprotic solvent is required to produce such polyamide acid intermediate before it can be converted to the polyimide state. Unlike polyamides, polyimides are intractable and decompose before they can be melted. At best, the more readily processable polyamide acid can be converted to a film or coating. Howevr, the removal of solvent causes air pollution.

As shown in our copending application Ser. No. 319,371 filed concurrently herewith now abandoned and assigned to the same assignee as the present invention, polyetherimide reaction products of aromatic bis(etheranhydride) and organic diamine can be made at elevated temperatures in the presence of organic solvent to produce moldable polyetherimides. However, organic solvent is required which causes air pollution. In addition, several additional processing steps are necessary before the final product can be recovered.

The present invention is based on the discovery that moldable polyetherimides can be made directly from certain aromatic bis(etheranhydride)s and organic diamines, as defined hereinafter, in the absence of organic solvent. These polyetherimide forming ingredients can be melt polymerized at temperatures up to 350° C.

There is provided by the present invention, a method for making polyetherimides which comprises effecting the removal of water of reaction at temperatures up to 350° C. from the melt of a mixture containing as essential ingredients aromatic bis(etheranhydride) of the formula, (1) 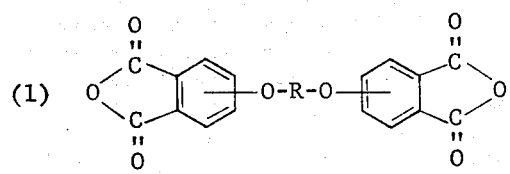

and organic diamine of the formula, (2)

$$H_2NR^1NH_2$$

where R is a divalent aromatic organic radical having from 6–30 carbon atoms, $R^1$ is a divalent organic radical selected from R radicals, alkylene radicals having from 2–20 carbon atoms, cycloalkylene radicals, and $C_{(2-8)}$ alkylene terminated polydiorganosiloxane radicals.

Radicals included by R are, for example, aromatic hydrocarbon radicals and halogenated aromatic hydrocarbon radicals, for example, phenylene, tolylene, chlorophenylene, naphthalene, etc., and radicals included by the formula,

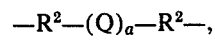

where $R^2$ is a divalent aromatic radical having from 6–13 carbon atoms selected from hydrocarbon radicals and halogenated hydrocarbon radicals, and Q is a divalent organo radical selected from $-C_YH_{2Y}-$,

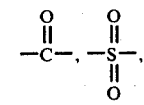

where $a$ is 0 or 1, $y$ is an integer having a value of from 1–5 inclusive, and $R^3$ is a monovalent hydrocarbon radical selected from methyl, phenyl, etc.

Radicals included by $R^1$ are, for example,

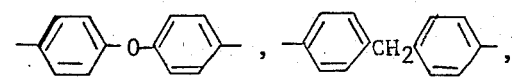

etc.; alkylene radicals such as hexamethylene, etc., cyclohexylene, etc.

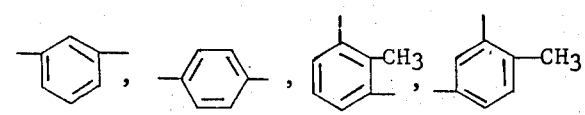

where $R^3$ is as defined above, $m$ is equal to 0 to 100 inclusive and $n$ is 2–8 inclusive.

Included by formula (1), dianhydrides are (3) 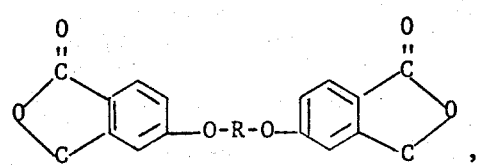

(4) 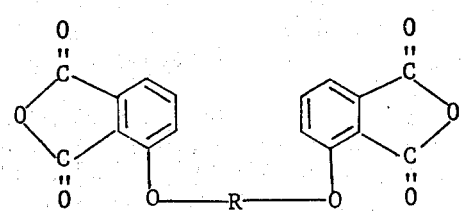

(5) 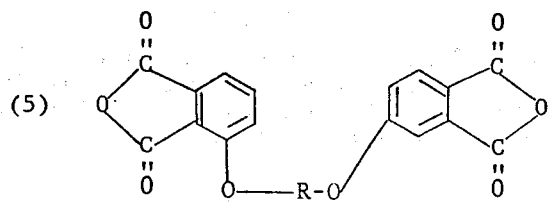

where R is defined above. A preferred from of R is,

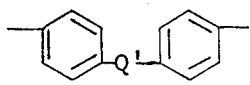

where Q' is selected from —O—, —S—,

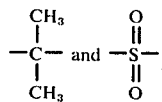

Dianhydrides included by formula (3) are for example,
2,2'-bis[4-(2,3-dicarboxyphenoxy)phenyl]-propane dianhydride;
4,4'-bis(2,3-dicarboxyphenoxy)diphenyl ether dianhydride;
1,3-bis(2,3-dicarboxyphenoxy)-benzene dianhydride;
4,4'-bis-(2,3-dicarboxyphenoxy)-diphenyl sulfide dianhydride;
1,4-bis(2,3-dicarboxyphenoxy)-benzene dianhydride;
4,4'-bis(2,3-dicarboxyphenoxy)-diphenyl sulfone dianhydride; etc.

Dianhydrides included by formulas (4) and (5) are for example,
2,2-bis[4-(3,4-dicarboxyphenoxy)-phenyl]-propane dianhydride;
4,4'-bis(3,4-dicarboxyphenoxy)-diphenyl ether dianhydride;
4,4'-bis(3,4-dicarboxyphenoxy)-diphenyl sulfide dianhydride;
1,3-bis(3,4-dicarboxyphenoxy)-benzene dianhydride;
1,4-bis(3,4-dicarboxyphenoxy)-benzene dianhydride;
4,4'-bis(3,4-dicarboxyphenoxy)-diphenylsulfone dianhydride;
4-(2,3-dicarboxyphenoxy)-4'-(3,4-dicarboxyphenoxy)-2,2-diphenyl propane dianhydride, etc.

In addition to formulas 3–5 above, aromatic bis-(etheranhydride)s also included by formula (1) are shown by Koton, M. M.; Florinski, F. S.; M. I.; Rudakov, A. T. (Institute of Heteroorganic Compounds, Academy of Sciences, USSR) USSR 257,010, Nov. 11, 1969, APPL 03 May 1967. In addition dianhydrides shown M. M. Koton, F. S. Florinski, Zh Org. Khin 4(5) 774 (1968).

Some of the aromatic bis(etheranhydrides) of formula (1) are shown in copending application of Darrell Heath and Joseph Wirth Ser. No. 281,749 filed Aug. 18, 1972 and assigned to the same assignee as the present invention. These dianhydrides can be prepared from the hydrolysis, followed by dehydration of the reaction product of a nitrosubstituted phenyl dinitrile with a metal salt of a dihydric phenol compound in the presence of a dipolar aprotic solvent. For example, a benzenoid compound of the formula,

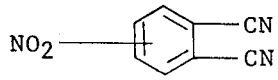

where the $NO_2$ group can be positioned anywhere in the benzene ring, can be reacted in dimethyl formamide with an alkali metal salt of a dihydric phenol of the general formula, $$Alk—O—R^2—O—Alk$$

where $R^2$ is a divalent aromatic radical and Alk is an alkali metal ion. Various well known procedures can be used to convert the resulting tetranitriles to the corresponding tetraacids and dianhydriides.

Included by the alkali metal salts of the above described dihydric phenols are sodium and potassium salts of the following dihydric phenols,
2,2-bis-(2-hydroxyphenyl)propane;
2,4'-dihydroxydiphenylmethane;
bis-(2-hydroxyphenyl)-methane;
2,2-bis-(4-hydroxyphenyl)-propane hereinafter identified as "bisphenol-A" or "BPA";
1,1-bis-(4-hydroxyphenyl)-ethane;
1,1-bis-(4-hydroxyphenyl)-propane;
2,2-bis-(4-hydroxyphenyl)-pentane;
3,3-bis-(4-hydroxyphenyl)-pentane;
4,4'-dihydroxybiphenyl;
4,4'-dihydroxy-3,3',5,5'-tetramethylbiphenyl;
2,4'-dihydroxybenzophenone;
4,4'-dihydroxydiphenly sulfone;
2,4'-dihydroxydiphenyl sulfone;
4,4'-dihydroxydiphenyl sulfoxide;
4,4'-dihydroxydiphenyl sulfide; etc.

In addition to the above described "Group A" dihydric phenols, there also can be employed in the present invention, aromatic bis(etheranhydrides) derived from the alkali metal salts of the following "Group B" dihydric phenols:
hydroquinone;
resorcinol;
3,4'-dihydroxydiphenyl methane;
4,4'-dihydroxybenzophenone; and 4,4'-dihydroxydiphenylether.

Included by the organic diamines of formula (2) are for example,
m-phenylenediamine;
p-phenylenediamine;
4,4'-diaminodiphenylpropane;
4,4-diaminodiphenylmethane;
benzidine,
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis (p-β-amino-t-butylphenyl) ether;

bis(p- β-methyl-o-aminopentyl)benzene;
1,3-diamino-4-isopropylbenzene;
1,2-bis (3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodedanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl) sulfide;
N-methyl-bis(3-aminopropyl)amine;
hexamethylenediamine;
heptamethylenediamine;
nonamethylenediamine;
decamethylenediamine;
bis-(3-aminopropyl)tetramethyldisiloxane;
bis-(4-aminobutyl)tetramethyldisiloxane; etc.

In the practice of the invention, a mixture of the aromatic bis(etheranhydride) and the organic diamine is heated under an inert atmosphere, such as a nitrogen atmosphere to form a homogenous melt and the water as it is formed is removed therefrom.

The temperature of the melt is maintained above the glass transition temperature of the resulting polyetherimide, but below a temperature of about 400° C. Preferably, the melt polymerization is conducted at a temperature of about between 250° to 300° C. The polymerization can be facilitated by agitation such as purging the melt with an inert gas such as nitrogen. It also has been found expedient to employ reduced pressure at the final stage of the polymerization to facilitate removal of water. Stirring of the mixture also can be employed. The course of the reaction can be readily followed by the change in melt viscosity of the mixture.

It has been found that substantially equal molar amounts of the organic diamine and the aromtic bis(etheranhydride) provide optimum results. Effective results can be achieved with 0.5 to 2.0 mole of organic diamine, per mole of aromatic bis(etheranhydride). Monofunctional organic amines such as aniline, or organic anhydrides such as phthalic anhydride provide molecular weight control. Low molecular weight polyetherimide can be employed to form copolymers. From 0.1 to 50 mole percent of comonomers based on the total moles of reactants can be employed.

Polyetherimide having from 2 to 500 and preferably 10 to 50 average repeating units can be formed. These polymers can be blended with various fillers such as silica fillers, glass fibers, carbon whiskers, perlite, etc. The resulting filled compositions can have a proportion of from about 1 parts to 70 parts of filler per hundred parts of polyetherimide. The blending of the filler with the polyetherimide can be achieved by adding the filler prior to forming the melt or directly to the melt. Stirring can be effected with a standard agitating means to facilitate blending the ingredients.

In order that those skilled in the art will be better able to practice the invention, the following examples are given by way of illustration and not by way of limitation. All parts are by weight.

EXAMPLE 1

A mixture 1¼2,2-bis[4-(2,3-dicarboxyphenoxy)-phenyl]propane dianhydride (3.0000 parts) and 4,4′methylenedianiline (1.1418 parts) was heated to 290° C for one-half hour under nitrogen, and for 1 ¼ hour in vacuo. the yield of the polymer was 2.0 parts. The intrinsic viscosity of the polymer in dimethylformamide was 0.46 dl/g. The elemental analysis found was: C, 77.8%; H, 4.5% and N, 4.1%. Calculated for $(C_{44}H_{30}N_2O_6)_n$ is: C, 77.4%; H, 4.4% and N, 4.1%. The infrared spectrum:

$\lambda_{max}$ 1770, 1714, 1352, 1274 and 1239 cm$^{-1}$. Based on method of preparation, elemental analysis and spectral data, the product was a polyetherimide.

The above polyetherimide is molded at 275° C and a pressure of 5000–10,000 psi to a finished part. The molded part forms an exact reproduction of the mold.

EXAMPLE 2

A mixture of 2,2-bis[4-(3,4-dicarboxyphenoxy)-phenyl]propane dianhydride (3.0000 parts) and 4,4′-diaminodiphenyl ether (1.1520 parts) was heated at 300° C. with stirring for one-half hour under nitrogen, and for 1¼ hour in vacuo. The yield of the polymer was 2.68 parts. The intrinsic viscosity in dimethylacetamide was 1.00 dl/g. The infrared spectrum was taken of a clear flexible film cast from a chloroform solution: $\lambda_{max}$; 1767, 1712, 1372, 1275, 1244 and 1217 cm$^{-1}$. The thermal decomposition temperature of the polymer was 510° C in nitrogen, and 410° C. in air as determined by thermal gravimetric analysis.

EXAMPLE 3

A mixture of 2,2-bis[3,4-dicarboxyphenoxy) phenyl]propane dianhydride (3.0000 parts), and, 4,4′-methylenedianiline (1.1418 parts) was heated at 290° C. for one-half hour under nitrogen and 1¼ hours under vacuum. The yield of the amber glassy polymer was 4.0 parts. The intrinsic viscosity of the polymer was 0.65 dl/g in dimethylformamide. The thermal decomposition temperature of the polymer was 450° C. in nitrogen and 420° C in air as determined by thermal gravimetric analysis. A tough flexible film was cast from a chloroform solution.

Based on method of preparation, the polymer was a polyetherimide.

EXAMPLE 4

A mixture of 2,2-bis[4-(2,3-dicarboxyphenoxy)-phenyl]propane dianhydride (6.0000 parts), phthalic anhydride (.1706 parts) and 4,4′-diaminodiphenyl ether (2.4236 parts) was heated to 270° C under nitrogen for one hour. The yield of the polymer was 7.49 parts. The intrinsic viscosity in dimethyl formamide was 0.34 dl/g. The number average and weight average molecular weights were 10,300 and 25,400, respectively.

EXAMPLE 5

A mixture of 4,4′-diaminodiphenyl ether (1.2152 parts) and 4,4′-bis(2,3-dicarboxyphenoxy)diphenyl ether dianhydride (3.0000 parts) was heated to 290° C under nitrogen with stirring. The yield of the tough glassy polymer was 2.8 parts. The intrinsic viscosity of the polymer was 0.53 dl/g in chloroform. The elemental analysis found: C, 72.4; H, 3.4% calculated for $(C_{40}H_{24}N_2O_8)_n$ is C, 72.7%; H, 3.5%. The thermal decomposition temperature was 480° C in air is determined by thermo-gravimetric analysis.

EXAMPLE 6

A mixture of 4,4'-bis(3,4-dicarboxyphenoxy)diphenyl ether dianhydride (3.5228 parts) and hexamethylenediamine (0.8529 parts) was heated to 290° C for 1 hour with stirring under nitrogen. The yield of the tough amber polymer was 3.0 parts. The intrinsic viscosity in chloroform was 0.48 dl/g. The elemental analysis found was: C, 71.6%; H, 4.9% and N, 4.7%. Calculated for $(C_{34}H_{28}N_2O_7)_n$ is C, 70.8%; H, 4.9%; and N, 4.9%. The thermal decomposition temperature was 440° C in nitrogen and 420° C in air as determined by thermal gravimetric analysis.

EXAMPLE 7

A mixture of 1,4-bis(2,3-dicarboxyphenoxy)benzene dianhydride (2.5000 parts and 4,4'-methylenedianilene (1.2320 parts) was heated to 290° C under nitrogen, with stirring for 1 hour. The yield of the polymer was 2.67 parts. The intrinsic viscosity in meta-cresol was 0.45 dl/g. The elemental analysis: C, 74.6%; H, 2.8%. Calculated for $(C_{22}H_{10}N_2O_6)$ is C, 73.6%; H, 2.9%. The infrared spectrum was taken from a tough flexible film cast from meta-cresol: $\lambda_{max}$ 1772, 1715, 1378, 1249 and 1885 cm$^{-1}$. The thermal decomposition temperature was 480° C in nitrogen and 480° C in air as determined by thermal gravimetric analysis.

EXAMPLE 8

A mixture of 4,4'-bis(3,4-dicarboxyphenoxy)-diphenylsulfide dianhydride (2.5571 parts) and bis-(4-aminobutyl)-tetramethyldisiloxane (1.4259 parts) were heated under nitrogen with stirring to 260° C. The yield of the polymer was 3.0 parts. The intrinsic viscosity in chloroform was 0.55 dl/g. The infrared spectrum was taken from a tough flexible film cast from chloroform: $\lambda_{max}$ 1762, 1702, 1440, 1390, 1230 and 1164 cm$^{-1}$. The thermal decomposition temperature of the polymer was 450° C. in nitrogen and 410° C. in air as determined by thermal gravimetric analysis.

EXAMPLE 9

A mixture of 2,2-bis[4-(2,3-dicarboxyphenoxy) phenyl]-propane dianhydride (5.1985 parts) and 4,4'-methylenedianiline (2.0000 parts) were heated to 270° C under nitrogen for 1 hour. The yield of the polymer was 6.09 parts. The intrinsic viscosity of the polymer was 0.46 dl/g in dimethylformamide. The elemental analysis found was: C, 77.8%; H, 4.5%; N, 4.1%. Calculated for $(C_{44}H_{30}N_2O_6)_n$ is C, 77.4%; H, 4.4% and N, 4.1%.

EXAMPLE 10

A mixture of 2,2-bis[4-(3,4-dicarboxyphenoxy)-phenyl]-propane dianhydride (50.0000 parts) and 4,4'-methylenedianiline (18.6722 parts) was heated to 270° C under nitrogen with stirring for 1½ hours. The intrinsic viscosity in diemthylformamide was 0.52 dl/g. The polymer was extruded at 275° C by use of a screw extruder. Molded samples were made of the extruded material. The molded samples had a tensile strength of 11,300 psi and the elongation was 6.7%.

EXAMPLE 11

A mixture of 2,2-bis[4-(2,3-dicarboxyphenoxy)-phenyl]propane dianhydride (1.5000 parts and 2,2-bis[4-(3,4-dicarboxyphenoxy)-phenyl]propane dianhydride (1.500 parts) and 4,4'-methylenedianiline (1.1418 parts) was heated with stirring to 290° C under nitrogen for 45 minutes and in vacuo for 15 minutes. The yield of the polymer was 3.2 parts. The intrinsic viscosity in chloroform was 1.37 dl/g. The infrared spectrum: $\lambda_{max}$: 1768, 1700, 1360, 1250, 1078 cm$^{-1}$.

EXAMPLE 12

A mixture of 1,4-bis(3,4-dicarboxyphenoxy)benzene dianhydride (2.2902 parts) and bis-(4-aminobutyl)tetramethyldisiloxane (1.5587 parts) was heated to 270° C with stirring for 45 minutes under nitrogen and for 15 minutes in vacuo. The yield of the polymer was 2.92 parts. The intrinsic viscosity of the polymer in chloroform was 0.37 dl/g. The infrared spectrum:$\lambda_{max}$ 1762, 1700, 1462, 1432, 1224, 1190 cm$^{-1}$. The thermal decomposition temperature of the polymer was 430° C in nitrogen and 390° C in air as determined by thermal gravimetric analysis.

EXAMPLE 13

A mixture of 2,2-bis[4-(2,3-dicarboxyphenoxy)]propane dianhydride (8.099 parts) and 2,4-toluenediamine (1.8628 parts) was heated under nitrogen at 240° C for 15 minutes. The melt was further heated at 275° under vacuum for 0.5 hours. The polymer melt was cooled, dissolved in about 100 parts of chloroform. The solution was poured in methanol to yield 8.80 parts of polymer.

EXAMPLE 14

A mixture of 2,2-bis[4-(2,3-dicarboxyphenoxy)-phenyl]propane dianhydride (6.690 parts) and hexamethylenediamine (1.494 parts) was heated at 225° for 20 minutes at 245° for 40 minutes and then at 245° under vacuum for 5 minutes. On cooling, amber colored, tough polymer was obtained in 93.4% yield. On the basis of the method of preparation, the polymer possesses the chemical constitutent of $C_{37}H_{32}N_2O_6$: Analysis found C, 74.7 and H, 5.5; calc. C, 74.0 and H, 5.4.

Based on method of preparation and elemental analysis the polymer was a polyetherimide. It is molded to a finished part in accordance with the procedure of Example 1.

EXAMPLE 15

A thoroughly powdered mixture of 51.01 g (9.8 × 10$^{-2}$ mol) of 2,2-bis[4-(3,4-dicarboxyphenoxy)-phenyl]propane dianhydride, 10.81 g (10.0 × 10$^{-2}$ mol) of 1,3-diaminobenzene and 0.5925 g (0.4 × 10$^{-2}$ mol) of phthalic anhydride was agitated at a temperature of 260° C. After 1½ minutes, the temperature of the mixture ws raised to 280° C. Agitation of the mixture continued for 20 minutes. There was obtained about a 92% yield of polyetherimide having an intrinsic viscosity of 0.44 dl/g in chloroform.

The polyetherimide had the following properties: $T_g$, 218° C; TGA, 5% weight loss in air or nitrogen at 535° C; oxygen index, 46 – 48; tensile strength, 15,800 psi; elongation (total), 18%; and GPC, $M_w/M_n$ = 49236/24619 = 2.00.

Additional runs were made using the same ratio of ingredients but the reaction time and/or temperature were varied. The intrinsic viscosities of these materials ranged from 0.42 to 0.78. All of these materials were soluble in such solvents as chloroform, dimethylformamide, etc. Blends of polymer were made with glass fibers consisting of 50 parts of filler per hundred parts of polyetherimide by adding the filler directly to the melt. The blends were used to make high performance composites.

EXAMPLE 16

A mixture of 4.412 parts of 2,2-bis[4-(2,3-dicarboxyphenoxy)phenyl]propane dianhydride, 0.945 part of m-phenylene diamine and 0.0777 part of phthalic anhydride was stirred and heated under nitrogen at 280°. Water vapor evolved and a viscous, clear melt resulted. The melt was stirred at 280° for 15 minutes and then further heated under vacuum (0.2 mm Hg) at the same temperature for 5 minutes. On cooling, a tough, clear, light yellow polymer was obtained. The intrinsic viscosity of the polymer was 0.47 dl/g in m-cresol. The glass transition temperature was 230° as measured by differential scanning calorimetry.

EXAMPLE 17

A mixture of 2.313 parts of 2,2-bis[4-(2,3-dicarboxyphenoxy)phenyl]propane dianhydride, 2.313 parts of 2,2-bis[4-(3,4-dicarboxyphenoxy)phenyl]propane diamhydride, 0.9907 part of m-phenylene diamine and 0.0814 part of phthalic anhydride was heated with stirring under nitrogen atmosphere at 280° for 15 minutes. The resulting viscous melt was further heated at 290° C under a pressure of 0.5 torr for 5 minutes. On cooling a yellow, glassy polymer was obtained. The polymer showed a glass transition of 224° as measured by DSC. The intrinsic viscosity of the polymer was 0.3 dl/g in dimethylformamide.

Although the above examples are limited to only a few of the very many variables which can be employed in the practice of the method of the present invention, it should be understood that the present invention is broadly directed to the employment of phenylene diamine such as metaphenylenediamine or paraphenylenediamine in combination with an aromatic bis(ether anhydride) as defined above in formula 1, to provide for the production of a melt of the resulting mixture and the removal therefrom of water of reaction. Those skilled in the art would also know that the employment of metaphenylenediamine or paraphenylenediamine in combination with aromatic bis(ether anhydride) of formula 1 would also be capable of forming polyetherimide in a continuous manner as set forth in our copending application Ser. No. 372,743 filed June 22, 1973 and assigned to the same assignee as the present invention.

What We claim as new and desire to secure by Letters Patent of the United States is:

1. A method for making polyetherimide which comprises effecting the removal of water of reaction at temperatures of from about 250° C to a temperature below about 400° C by using either stirring, an inert gas purge, or reduced pressure, from the melt of a mixture containing as essential ingredients m-phenylene diamine and aromatic bis(etheranhydride) selected from the class consisting of 2,2-bis[4-(3,4-dicarboxyphenoxy)phenyl]propane dianhydride, 2,2-bis[4-(2,3-dicarboxyphenoxy)phenyl]propane dianhydride, and 2-[4-(2,3-dicarboxyphenoxy)phenyl]-2-[4-(3,4-dicarboxyphenoxy)phenyl]propane dianhydride and mixtures thereof, where there is utilized from 0.5 to 2.0 moles of m-phenylene diamine per mole of aromatic bis(etheranhydride).

2. A method in accordance with claim 1, where the aromatic bis(etheranhydride) and m-phenylene diamine are present in substantially equal molar amounts.

3. A method in accordance with claim 1, utilizing 2,2-bis[4-(3,4-dicarboxyphenoxy)phenyl]propane dianhydride.

4. A method in accordance with claim 1 employing 2,2-bis[4-(2,3-dicarboxyphenoxy)phenyl]propane dianhydride.

* * * * *

UNITED STATES PATENT OFFICE
CERTIFICATE OF CORRECTION

PATENT NO. : 3,989,670
DATED : Nov. 2, 1976
INVENTOR(S) : Tohru Takekoshi and John E. Kochanowski It is certified that error appears in the above-identified patent and that said Letters Patent are hereby corrected as shown below:

Column 2, line 55, cancel

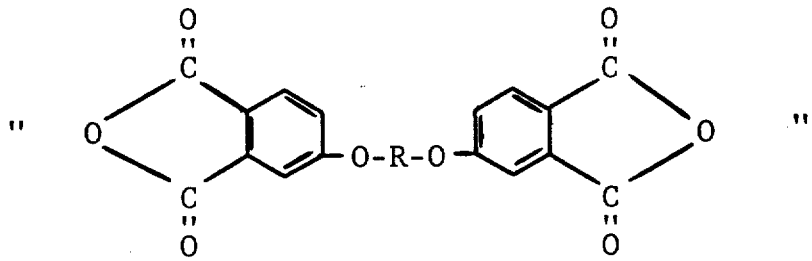

and substitute

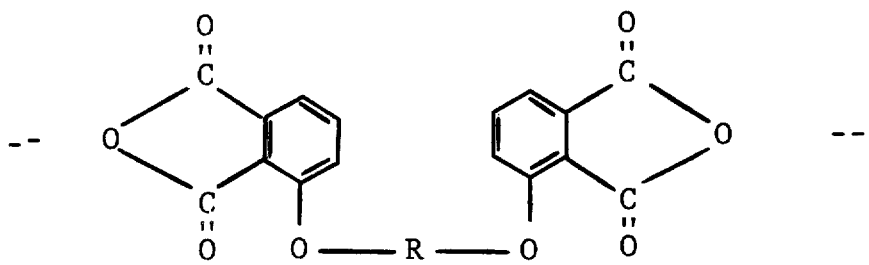

UNITED STATES PATENT OFFICE
CERTIFICATE OF CORRECTION

PATENT NO. : 3,989,670
DATED : Nov. 2, 1976
INVENTOR(S) : Tohru Takekoshi and John E. Kochanowski It is certified that error appears in the above-identified patent and that said Letters Patent are hereby corrected as shown below:

Column 2, line 65, cancel

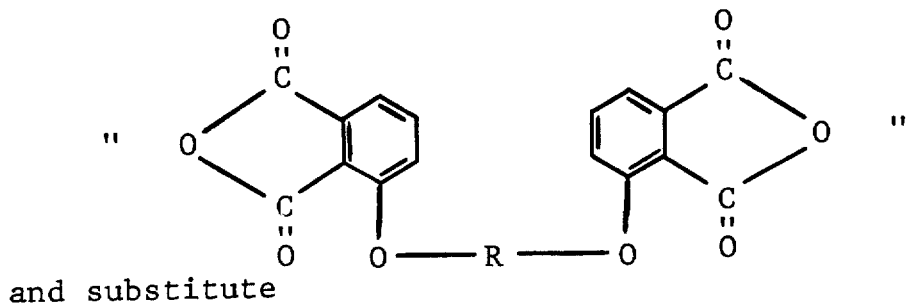

and substitute

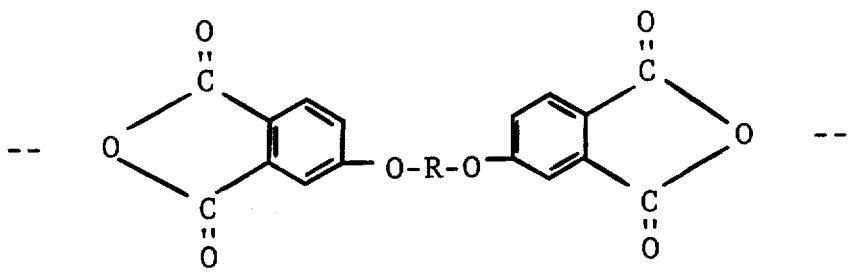

Signed and Sealed this

Fifth Day of April 1977

[SEAL]

Attest:

RUTH C. MASON
*Attesting Officer*

C. MARSHALL DANN
*Commissioner of Patents and Trademarks*